US009026561B2

(12) United States Patent
Hills et al.

(10) Patent No.: US 9,026,561 B2
(45) Date of Patent: May 5, 2015

(54) AUTOMATED REPORT OF BROKEN RELATIONSHIPS BETWEEN TABLES

(75) Inventors: Kathleen F. Hills, Endicott, NY (US); Thomas Kersjes, Arlington Heights, IL (US); Mark A. Musa, Brackney, PA (US); Fu-Chen Pan, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 388 days.

(21) Appl. No.: 13/539,522

(22) Filed: Jul. 2, 2012

(65) Prior Publication Data

US 2014/0006367 A1 Jan. 2, 2014

(51) Int. Cl.
*G06F 17/30* (2006.01)
*G06F 7/00* (2006.01)

(52) U.S. Cl.
CPC ................................ *G06F 17/30292* (2013.01)

(58) Field of Classification Search
CPC .................... G06F 17/30292; G06F 17/30289; G06F 17/30339; G06F 17/30; G06F 17/30091; G06F 17/30595; G06F 17/245
See application file for complete search history.

(56) References Cited

U.S. PATENT DOCUMENTS

| | | | |
|---|---|---|---|
| 4,933,848 A | 6/1990 | Haderle et al. | |
| 5,386,557 A | 1/1995 | Boykin et al. | |
| 5,553,218 A | 9/1996 | Li et al. | |
| 5,706,494 A | 1/1998 | Cochrane et al. | |
| 6,427,143 B1 | 7/2002 | Isip, Jr. et al. | |
| 7,162,478 B2 | 1/2007 | Gerber et al. | |
| 7,930,291 B2 | 4/2011 | Blaicher et al. | |
| 8,082,243 B2 | 12/2011 | Gorelik et al. | |
| 8,275,810 B2* | 9/2012 | Barton | 707/803 |
| 8,768,966 B2* | 7/2014 | Yaniv et al. | 707/785 |
| 2007/0011192 A1* | 1/2007 | Barton | 707/103 R |
| 2011/0029577 A1* | 2/2011 | Notani et al. | 707/804 |
| 2012/0159433 A1* | 6/2012 | Ahadian et al. | 717/113 |
| 2012/0246179 A1* | 9/2012 | Garza et al. | 707/752 |
| 2012/0278282 A1* | 11/2012 | Lu et al. | 707/634 |

* cited by examiner

*Primary Examiner* — Dung K Chau
(74) *Attorney, Agent, or Firm* — Nicholas L. Cadmus (57) ABSTRACT

In a method for reporting data loaded to a database that does not adhere to referential constraints of the database that are not enforced, a computer receives a file of Data Definition Language (DDL) statements for creating a database. The computer identifies statements from the DDL statements that comprise text indicating the statements are referential constraints that are not to be enforced. The computer converts indentified statements to create view statements. The computer generates a file comprising the create view statements. Create view statements are used to generate database views during database build. The computer generates a file, comprising the received DDL statements without the statements that comprise the text indicating the one or more DDL statements are referential constraints not to be enforced in the database. The computer, responsive to new data being loaded to the database, creates a report comprising data from the database views.

15 Claims, 9 Drawing Sheets

DROP TABLE PeS.Employee;                        ⎫
330 ⎯⎯ CREATE TABLE PeS.Employee (                       ⎪
        Employee_ID      CHAR(8) NOT NULL,              ⎪
        Dept_ID          CHAR(10) NOT NULL,             ⎪
        Employee_Last_Name   VARCHAR(40),               ⎪
        Employee_First_Name  VARCHAR(40),               ⎪
        Employee_Birth_Date  DATE                       ⎪
        );                                              ⎪

CREATE UNIQUE INDEX VSC.XPKEmployee ON PeS.Employee
        (                                               ⎪
        Employee_ID            ASC                      ⎪
        );                                              ⎪

ALTER TABLE PeS.Employee                        ⎪
           ADD CONSTRAINT XPKEmployee PRIMARY KEY (Employee_ID)
                                                        ⎪
        Create View PeS.Vmployee as                     ⎪
        Select * from PeS.Employee                      ⎪
        Where row_status_cd<>'D';                       ⎬ 310

DROP TABLE PeS.Department;                      ⎪
340 ⎯⎯ CREATE TABLE PeS.Department (                     ⎪
        Dept_ID         CHAR(10) NOT NULL,              ⎪
        Dept_Name       VARCHAR(30)                     ⎪
        );                                              ⎪

CREATE UNIQUE INDEX VSC.XPKDepartment ON PeS.Department
        (                                               ⎪
        Dept_ID                ASC                      ⎪
        );                                              ⎪

ALTER TABLE PeS.Department                      ⎪
           ADD CONSTRAINT XPKDepartment PRIMARY KEY (Dept_ID);
                                                        ⎪
        Create View PeS.Vepartment as                   ⎪
        Select * from PeS.Department                    ⎪
        Where row_status_cd<>'D';                       ⎭

ALTER TABLE PeS.Employee                        ⎫
           ADD CONSTRAINT NO_RI                         ⎪
              FOREIGN KEY (Dept_ID)                     ⎬ 320
                 REFERENCES PeS.Department (Dept_ID)    ⎪
                 ON DELETE RESTRICT                     ⎪
                 ON UPDATE RESTRICT;                    ⎭
```

```
#!/bin/ksh

# Required input: 1) DDL file name to process  2) tabschema to use on view create statements
# A sample script run command is: BPM_CREATE_NOT_EXISTS_VIEWS.script DLBPM10101_101109.sql BPM

input_file=${1:?"The input DDL file name must be supplied"}
viewschema=${2:?"The tabschema of the views must be supplied"}

rm test.out
rm ddl_to_convert.data

print_hold_area=' '
rm RI_FOR_VIEWS_REMOVED_${input_file}

# Following do while loop prepares two files:

# 1) file starting with: "RI_REMOVED_" contains the input DDL statements with the
#    "alter foreign key" ri constraint statements removed

# 2) file: ddl_to_convert.data contains the "alter foreign key" ri constraint statements.
#    The file is input to code later in the script which converts the statements to create
#    "where not exist" view statements

# The code combines all input ddl lines related to a single "alter" command into one line within
# file ddl_to_convert.data. This allows subsequent grep and read commands to work against a single
# line containing all required data.

# The "print - " command format is required to properly write the comments in the input DDL file to
# the output ddl file starting with: "RI_REMOVED_". Without the use of the "-" parm on the print
# command, the "--" within the DDL file are treated as part of the print command.

while read var1 var2
do
  if [[ $var1 = 'ALTER' ]] then
  print_hold_area="$print_hold_area $var1 $var2"
  alter_flag='Y'
  elif [[ $alter_flag = 'Y' ]] then
     print_hold_area="$print_hold_area $var1 $var2"
     print $var1$var2 | grep ';' > temp.data
     if (( $? == 0 )) then
        alter_flag='N'
        print $print_hold_area > test.out
        pg test.out | grep NO_RI >> ddl_to_convert.data
        if (( $? != 0 )) then
           pg test.out >> RI_FOR_VIEWS_REMOVED_${input_file}
        fi
        print_hold_area=' '
     fi
  else
     print - "$var1 $var2" >> RI_FOR_VIEWS_REMOVED_${input_file}
```

FIG. 5A

```
fi
done < $input_file

# Following statement reads each line from ddl_to_convert.data and removes alter key words not
# required to convert the alter statement to a create view statement.  File: processing.file
# is created.  The below statement would need to be edited if other alter key words are used
# in the model generation of the "alter foreign key" ri statement.

pg ddl_to_convert.data | sed 's/ALTER TABLE//g' | sed 's/ADD CONSTRAINT.*FOREIGN KEY//g' | sed
's/REFERENCES//g' | sed 's/ ON DELETE NO ACTION ON UPDATE NO ACTION;//g' | sed 's/ ON DELETE
CASCADE ON UPDATE RESTRICT;//g' | sed 's/ON DELETE RESTRICT ON UPDATE RESTRICT;//g' | sed
's/,//g' | sed 's/(//g' | sed 's/)//g' | tr -s " " > processing.file

rm RI_CREATE_VIEWS_${input_file}

# Following do while loop builds the "where not exist" create view statements. The current db2
# limit for columns in a ri constraint is 16.  The following read process would need to be rewritten
# if this limit changes.  The do while loop reads each line from file: processing.file into an array
# having 35 entries defined.  To make arithmetic in the code easier to follow, array entry [0] is
# not used.

while read var[1] var[2] var[3] var[4] var[5] var[6] var[7] var[8] var[9] var[10] var[11] var[12] var[13] var[14]
var[15] var[16] var[17] var[18] var[19] var[20] var[21] var[22] var[23] var[24] var[25] var[26] var[27] var[28]
var[29] var[30] var[31] var[32] var[33] var[34]
do

# Determine the number of variables which belong to the child and parent tables.  The
# child tabschema and tabname are contained in var[1] through var[$range_num].  The parent
# tabschema and tabname is then located in var[$range_num+1] through var[$num_words].

  print ${var[*]} > processing.data
  num_words=`pg processing.data | wc -w | tr -d " "`
  range_num=`expr $num_words / 2`

# Parse the tabschema and tabname into seperate variables

  child_schema=${var[1]%.*}
  child_table=${var[1]#*.}
  parent_schema=${var[$range_num+1]%.*}
  parent_table=${var[$range_num+1]#*.}

# Build create view statements

  print "CREATE VIEW $viewschema.RI_${child_table}_TO_${parent_table} AS" >>
RI_CREATE_VIEWS_${input_file}
  print "   SELECT * FROM ${var[1]} A " >> RI_CREATE_VIEWS_${input_file}
  print "   WHERE NOT EXISTS (SELECT 1 FROM ${var[$range_num+1]} B" >>
RI_CREATE_VIEWS_${input_file}
  print "            WHERE A.${var[2]} = B.${var[$range_num+2]}" >> RI_CREATE_VIEWS_${input_file}

```

FIG. 5B

```
   count_processed=3

   until [[ $count_processed -gt $range_num ]]
   do
     print "                    AND A.${var[$count_processed]} =
B.${var[$range_num+$count_processed]}" >> RI_CREATE_VIEWS_${input_file}
     count_processed=$count_processed+1
   done
   print ");" >> RI_CREATE_VIEWS_${input_file}
   print " " >> RI_CREATE_VIEWS_${input_file}

# Grant statements for dataarch id are built for each view.  Copy the statement to create grant
# statements for other ids (group or user) which need select access to the views.

   print "grant select on table $viewschema.RI_${child_table}_TO_${parent_table} to user dataarch;"
>> RI_CREATE_VIEWS_${input_file}
   print " " >> RI_CREATE_VIEWS_${input_file}
done < processing.file
```

FIG. 5C

```
CREATE VIEW PES.RI_Employee_TO_Department AS
SELECT * FROM PeS.Employee A
WHERE NOT EXISTS (SELECT 1 FROM PeS.Department B
    WHERE A.Dept_ID = B.Dept_ID
);
```

FIG. 6

Employee (730)

| Employee ID | Dept ID | Employee Last Name | Employee First Name | Employee Birth Date |
|---|---|---|---|---|
| 11234X | D110 | Smith | Mark | 10/10/1975 |
| 2673X | D110 | Burns | Tom | 12/30/1977 |
| 993456 | D120 | Alt | Rich | 3/23/1960 |
| 76328 | Z222 | Carey | Allisa | 5/6/1980 |

Department (740)

| Dept ID | Dept Name |
|---|---|
| D110 | Accounting |
| D120 | Procurement |
| X200 | Sales |

| 76328 | Z222 | Carey | Allisa | 5/6/1980 |
|---|---|---|---|---|

AUTOMATED REPORT OF BROKEN RELATIONSHIPS BETWEEN TABLES

TECHNICAL FIELD

The present invention relates generally to database management and more specifically to a method, system, and computer program product for reporting data loaded to a database that does not adhere to not enforced referential constraints of the database.

BACKGROUND

A database is an integrated collection of data records, files, and other database objects needed by an application. Database objects are stored in database tables that are accessible to a user. A database management system ("DBMS") is the software that controls the creation, maintenance, and the use of a database. The DBMS handles user queries for data.

A relational database is a database that is perceived by its users as a collection of tables. Each table arranges items and attributes of the items in rows and columns, respectively. Each table row corresponds to an item, and each table column corresponds to an attribute of the item (referred to as a field or, more correctly, as an attribute type or field type).

Database management systems provide mechanisms that permit users to constrain the value of one database entity based on the value or existence of another database entity. One common constraint type is the referential constraint. Referential constraints require that a value referred to by one database entity (e.g., a row in a first table) is associated with an existing entity in the database (e.g., another row in the same or different table). In the context of the Structured Query Language ("SQL"), referential constraints are implemented through the use of Foreign Keys, wherein a database entity's Foreign Key value must equate to the Primary Key value of another, existing, database entity.

A Primary Key for a table is a simple or composite attribute that uniquely identifies rows of the table. A key must be inherently unique and not merely unique at a particular point in time. It is possible, but not typical, to have a table where the only unique identifier is the composite attribute consisting of all the attributes of the table. It is also possible, but not typical, for a table to have more than one unique identifier. In such a case, the table may be said to have multiple candidate keys, one of which could be chosen and designated as the Primary Key; the remaining candidates then would be said to be "alternate keys". Collectively, primary and alternate keys may be referred to as "unique" keys. Primary and alternate keys must satisfy two time independent properties. First, at no time may two rows of the table have the same value for the key. And second, if the key is composite, then no component of the key can be eliminated without destroying the uniqueness property.

A Foreign Key can be a composite attribute of a table having values required to match those of the Primary Key of some table, which is typically but not necessarily distinct from the table for which the Foreign Key is defined. A Foreign Key value represents a reference to the row containing the matching Primary Key value, which may be called the referenced row or the target row.

A "referential integrity" rule requires a database system to maintain "referential integrity" between Foreign Keys and Primary Keys. The rule states that a database must not contain any unmatched Foreign Key values. An unmatched Foreign Key value is a non-null value for which there does not exist a matching value of the Primary Key in the relevant target table. Note that referential integrity requires Foreign Keys to match Primary Keys. A database system is not required to maintain integrity with respect to alternate keys.

A data warehouse (DW) is a database used for reporting and analysis. The data stored in the warehouse is uploaded from source operational systems (systems that process the day-to-day transactions of an organization). Normally a DW has a data model that describes its information. The data model may have defined referential constraints between tables which are not implemented in the physical build of the database. The referential constraints are not implemented to allow for the loading of data from multiple source databases and to increase the speed of loading. By not building referential constraints between tables, source data can be loaded which does not adhere to the data model constraints.

SUMMARY

Aspects of an embodiment of the present invention disclose a method, system, and a program product for reporting data loaded to a database that does not adhere to one or more referential constraints of the database that are not enforced. The method includes a computer receiving an original file of a plurality of Data Definition Language (DDL) statements for creating a database. The method further includes the computer identifying one or more DDL statements from the plurality of DDL statements that comprise text indicating the one or more DDL statements are referential constraints that are not to be enforced in the database, and in response, the computer converting the one or more DDL statements to one or more DDL create view statements, respectively. The method further includes the computer generating a first file comprising the one or more DDL create view statements, wherein the one or more DDL create view statements are used to generate one or more database views, respectively, during the build of the database. The method further includes the computer generating a second file, comprising the plurality of DDL statements without the one or more DDL statements from the plurality of DDL statements that comprise the text indicating the one or more DDL statements are referential constraints not to be enforced in the database, used to build the database. The method further includes the computer, responsive to new data being loaded to the database, creating a report comprising data from the one or more database views.

BRIEF DESCRIPTION OF THE SEVERAL VIEWS OF THE DRAWINGS

FIGS. 5A-5C depict exemplary program code for executing steps of a reporting function in accordance with one embodiment of the present invention.

DETAILED DESCRIPTION

Data that is uploaded to a target database from a source operational system may have referential constraints between tables in the source database that cannot be easily maintained in the target database. The referential constraints between tables are not examined or enforced in the target database when data is loaded. Users may have a need to know what data is not conforming to the referential constraints of the target database. The following discloses a method, system, and computer program product for reporting data loaded to a database that does not adhere to the referential constraints of the database that are not enforced.

The present invention will now be described in detail with reference to the figures.

Figure 1:
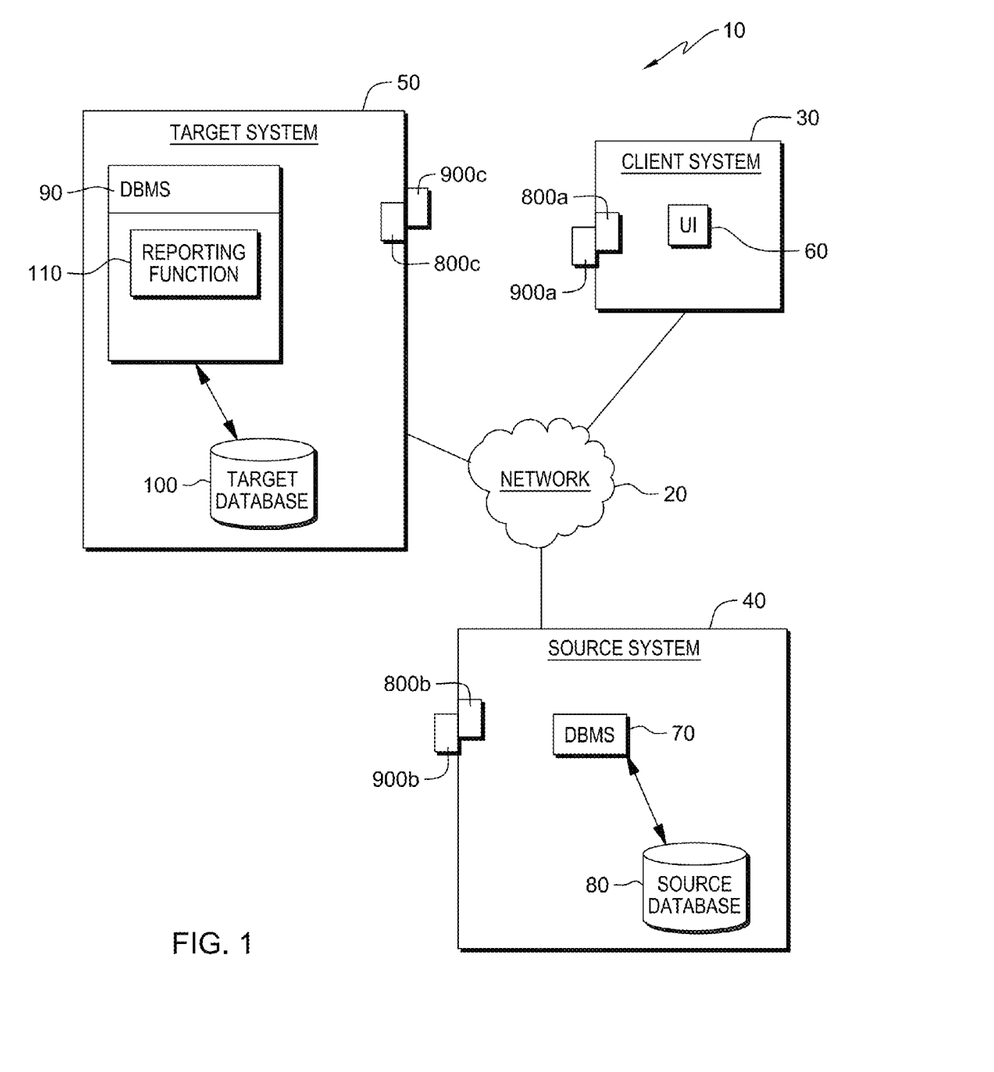
FIG. 1 depicts a diagram of a computing system in accordance with one embodiment of the present invention.

FIG. 1 depicts a diagram of computing system 10 in accordance with one embodiment of the present invention. FIG. 1 provides only an illustration of one embodiment and does not imply any limitations with regard to the environments in which different embodiments may be implemented.

In the depicted embodiment, system 10 includes client system 30, source system 40, and target system 50 interconnected over network 20. Network 20 may be a local area network (LAN), a wide area network (WAN) such as the Internet, or any combination of connections and protocols that will support communications between client system 30, source system 40, and target system 50 in accordance with embodiments of the invention. Network 20 may include wired, wireless, or fiber optic connections. System 10 may include additional target systems, client systems, or other devices not shown.

Client system 30 is a desktop computer. In other embodiments, client system 30 may be a laptop computer, tablet computer, personal digital assistant (PDA), or smart phone. In general, client system 30 may be any electronic device or computing system capable of sending and receiving data, and communicating with source system 40 and target system 50. Client system 30 contains UI (User Interface) 60.

Source system 40 and target system 50 are database servers. In other embodiments source system 40 and target system 50 may be management servers, web servers, or any other electronic devices or computing systems capable of receiving and sending data. In other embodiments, source system 40 and target system 50 may each represent a server computing system utilizing multiple computers as a server system, such as in a cloud computing environment. Source system 40 contains DBMS 70 and source database 80. Target system 50 contains DBMS 90, target database 100, and reporting function 110.

UI 60 operates on client system 30 to visualize content, such as menus and icons, and to allow a user to interact with the client system or an application. In one embodiment, UI 60 comprises an interface to a DBMS. UI 60 may display data received from DBMS 90 and send user input to DBMS 70 or 90. In other embodiments, UI 60 may comprise one or more interfaces such as, an operating system interface and application interfaces.

DBMS 70 and 90 operate to control the creation, maintenance, and the use of source database 80 and target database 100, respectively. DBMS 70 and 90 can be database management system programs such as IBM® DB2®. In other embodiments, DBMS 70 and 90 may be any other program or function that can control the creation, maintenance, and the use of source database 80 or target database 100. In one embodiment, DBMS 70 resides on source system 40 and DBMS 90 resides on target system 50. In other embodiments, DBMS 70 and 90 may reside on other computing systems or devices provided that the DBMS have access to source database 80 and target database 100, respectively, have access to each other, and can communicate with UI 60.

Source database 80 is a database that may be written and read by DBMS 70. For example source database 80 may be a database such as an IBM® DB2® database or an Oracle® database. In one embodiment, source database 80 represents a source operational system that contains data to be uploaded to target database 100. Source database 80 is located on source system 40. In another embodiment, source database 80 may be located on another system or another computing device, provided that the source database is accessible to DBMS 70.

Target database 100 is a database that may be written and read by DBMS 90. For example target database 100 may be a database such as an IBM® DB2® database or an Oracle® database. In one embodiment, target database 100 is located on target system 50. In another embodiment, target database 100 may be located on another system or another computing device, provided that the target database is accessible to DBMS 90.

Reporting function 110 operates to report data loaded to a database that does not adhere to not enforced referential constraints of the database. Reporting function 110 will create database Views based on received referential constraints, not enforced in a target database, and data loaded to the target database that does not conform to the received referential constraints.

In one embodiment, database Views are stored queries accessible as virtual tables computed or collated from data in the database. A database View does not form part of the physical schema of a database. Database Views are created using SQL Create View statements. An example of an SQL Create View statement is discussed in greater detail with reference to FIG. 6.

Figure 6:
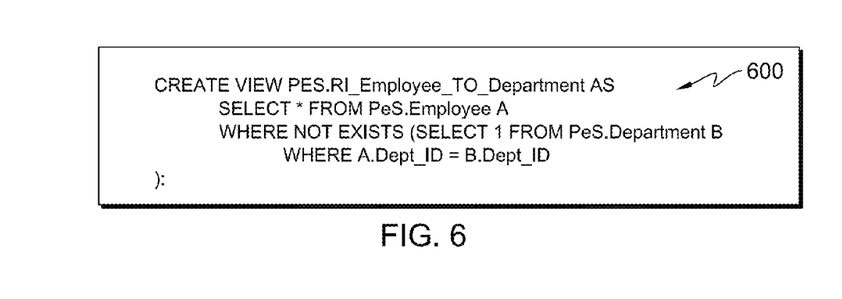
FIG. 6 is an exemplary DDL Create View statement contained in a file of DDL Create View statements generated by a reporting function, in accordance with one embodiment of the present invention.

In one embodiment, reporting function 110 receives, from UI 60, a file of DDL statements that contains statements creating the structure of the target database and referential constraints specifically labeled so as to identify specific constraints that are not to be enforced in the target database. An example of a file of DDL statements is discussed in greater detail with reference to FIG. 3. Reporting function 110 generates a file of DDL Create View statements based on the referential constraints specifically labeled and a file of DDL statements that contains the original statements creating the structure of the target database with the referential constraints specifically labeled removed. The two files generated by reporting function 110 are executed to build target database 100, from the file of DDL statements that contains the original statements creating the structure of the target database with the referential constraints specifically labeled removed, and database Views, from the file of DDL Create View statements. Responsive to data being loaded to target database 100, reporting function 110 queries the database Views to create a report showing the data loaded to target database 100 that does not conform to the referential constraints that the DDL Create View Statements were based on.

In another embodiment, reporting function 110 reporting function 110 receives, from UI 60, a file of DDL statements that contains statements creating the structure of the target database and referential constraints. In this embodiment, reporting function 110 generates a file of DDL Create View statements based on all referential constraints concerning foreign keys and a file of DDL statements that contains the original statements creating the structure of the target database with the referential constraints concerning foreign keys removed. The two files generated by reporting function 110 are executed to build target database 100, from the file of DDL statements that contains the original statements creating the structure of the target database with the referential constraints concerning foreign keys removed, and database Views, from the file of DDL Create View statements. Responsive to data being loaded to target database 100, reporting function 110 queries the database Views to create a report showing the data loaded to target database 100 not conforming to the referential constraints on which the DDL Create View Statements were based.

In one embodiment, reporting function 110 is a function of DBMS 90 on target system 50. In other embodiments, reporting function 110 may be a separate program that resides on another system or another computing device, provided that the reporting function is able to access DBMS 70 and 90, and communicate with UI 60.

Client system 30, source system 40, and target system 50, each maintain respective internal components 800a, 800b, and 800c, and respective external components 900a, 900b, and 900c. In general, client system 30, source system 40, and target system 50 can be any computing system as described in further detail with respect to FIG. 8.

Figure 2:
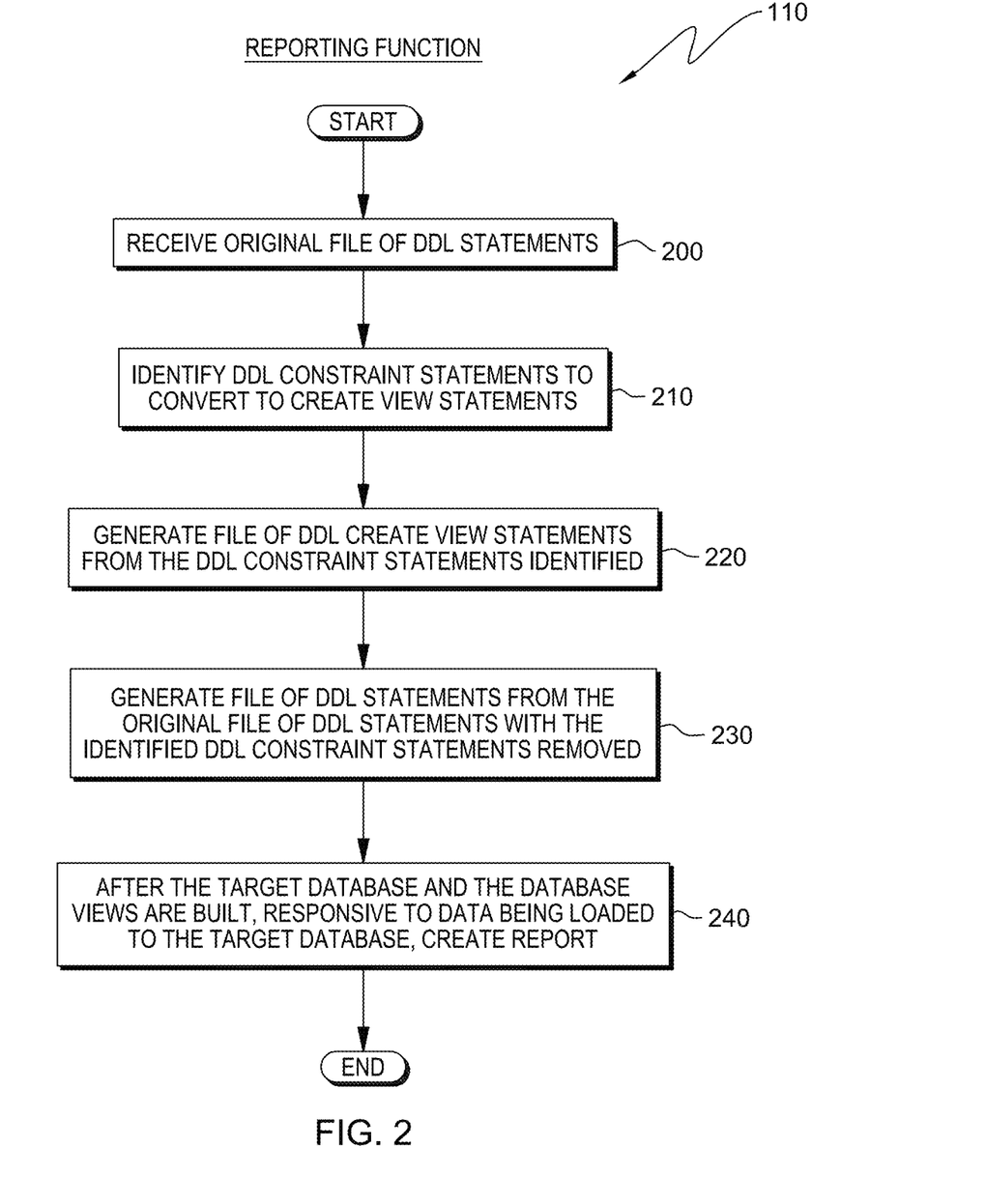
FIG. 2 depicts a flowchart of the steps of a reporting function executing within the computing system of FIG. 1, for reporting data loaded to a database that does not adhere to the referential constraints of the database that are not enforced, in accordance with one embodiment of the present invention.

FIG. 2 depicts a flowchart of the steps of reporting function 110 executing within the computing system of FIG. 1, for reporting data loaded to a database that does not adhere to not enforced referential constraints of the database, in accordance with one embodiment of the present invention.

Figure 3:
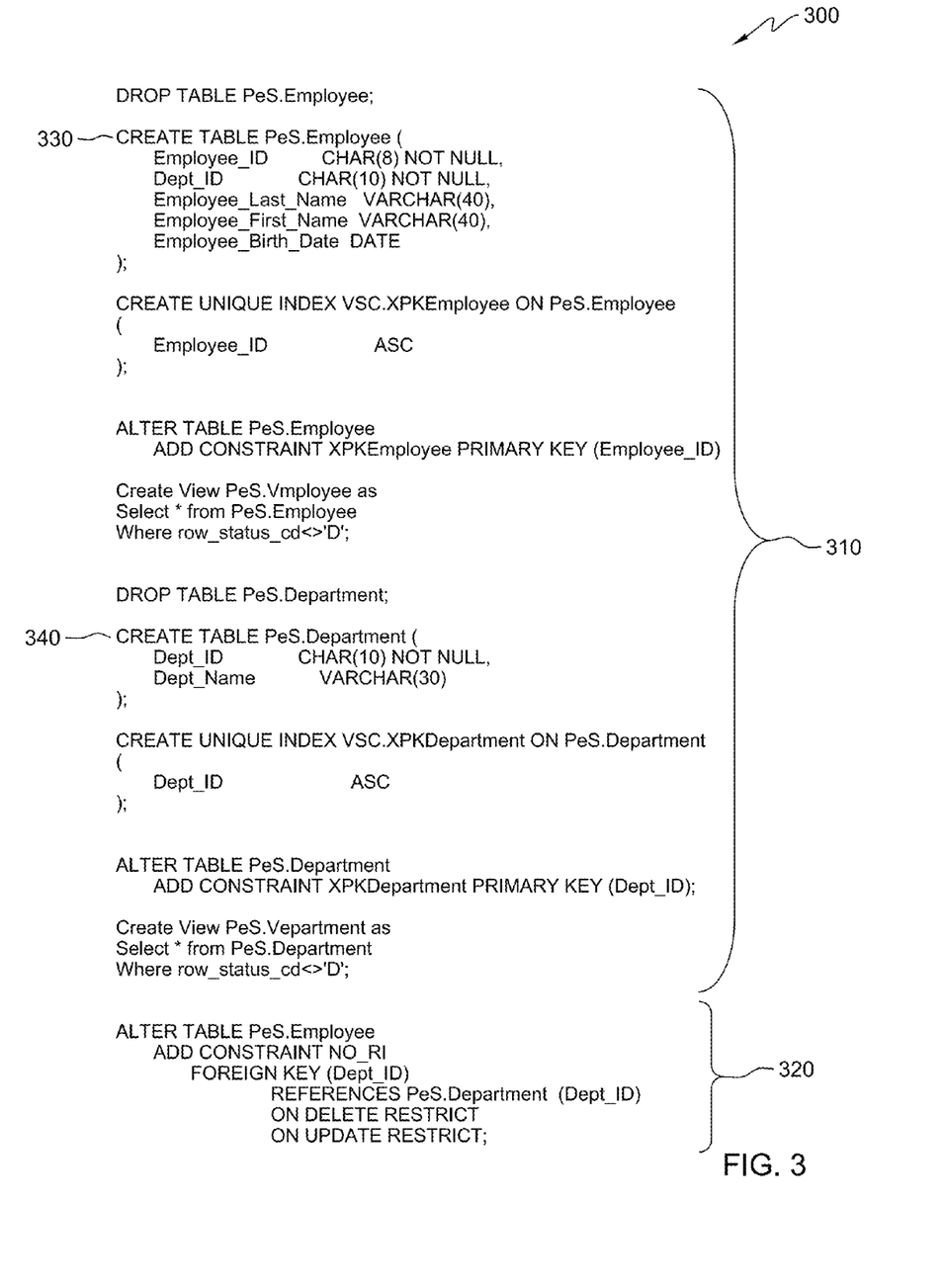
FIG. 3 is an exemplary file of DDL statements received by a reporting function in accordance with one embodiment of the present invention.

In one embodiment, initially, a user (e.g., Database Administrator) at client system 30 will create an original file of DDL statements using a data definition subsystem (used to define the structure of the files in a database) of DBMS 90 or a separate data modeler program accessed through UI 60. An exemplary original file of DDL statements, file 300, is discussed in greater detail with reference to FIG. 3. The user also determines which referential constraints will be used to generate DDL Create View statements and adds those referential constraints to the original file of DDL statements as NO_RI (NO Referential Integrity) as shown in FIG. 3. UI 60 sends the original file of DDL statements to reporting function 110, over network 20. In another embodiment, UI 60 sends the original file of DLL statements to DBMS 90, over network 20.

In step 200, reporting function 110 receives the original file of DDL statements from UI 60. In another embodiment, reporting function 110 receives the original file of DDL statements from DBMS 90 if the original file of DDL statements was first sent to DBMS 90 from UI 60.

In response to receiving the original file of DDL statements, reporting function 110 identifies referential constraints that will be used to generate DDL Create View statements (step 210). In one embodiment, reporting function 110 searches the text of the received original file of DDL statements for referential constraints labeled NO_RI, the referential constraints labeled NO_RI will be used to generate DDL Create View statements. In another embodiment, reporting function 110 searches the text of the received original file of DDL statements for all referential constraints concerning foreign keys, the referential constraints concerning foreign keys will be used to generate DDL Create View statements.

Figure 5C:
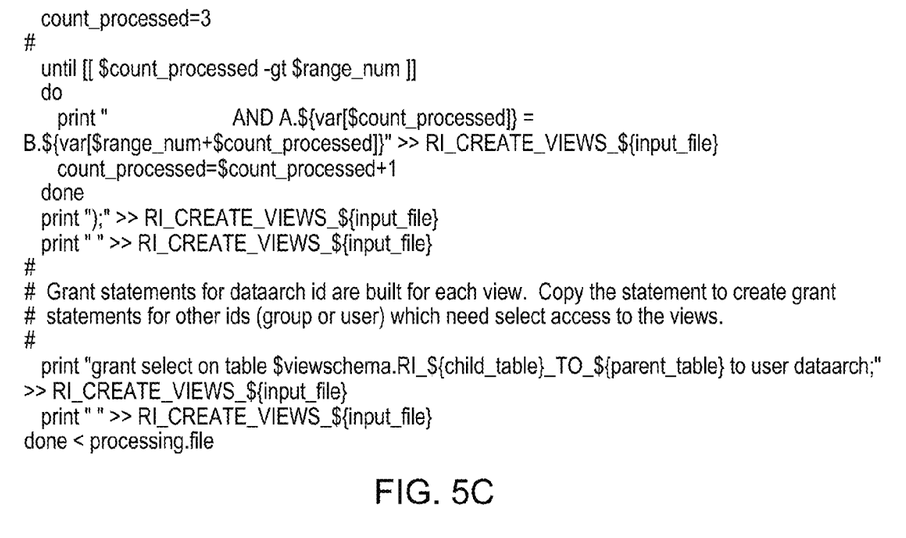

In step 220, reporting function 110 generates a file of DDL Create View statements based on the referential constraints identified in step 210. In one embodiment, reporting function 110 converts the referential constraints identified in step 210 to DDL Create View statements as shown in FIG. 6. In step 230, reporting function 110 generates a file of DDL statements that contains the original statements creating the structure of the target database with the referential constraints identified in step 210 removed. Exemplary program code for executing steps 210 through 230 of reporting function 110 is shown in FIGS. 5A-5C, in accordance with one embodiment of the present invention.

In one embodiment, reporting function 110 sends the file of DDL Create View statements and the file of DDL statements that contains the original statements creating the structure of the target database with the referential constraints identified removed to DBMS 90. DBMS 90 executes the received files to build target database 100 and the database Views. In another embodiment, reporting function 110 executes the files to build target database 100 and the database Views, directly.

In one embodiment, after target database 100 and the database Views are built, data from source database 80 is loaded to the target database. In one embodiment, a function of DBMS 90 will call DBMS 70, over network 20, to fetch data to be loaded to target database 100. After the data is loaded, the function of DBMS 90 will send an indication that the data has been loaded to reporting function 110. In other embodiments, any program that can communicate with DBMS 70 and 90, including reporting function 110, can be programmed to retrieve data from source database 80 and transfer the data to target database 100. After the data is loaded, the program which loads the data to target database 100 will send an indication that data was loaded to the target database to reporting function 110.

Responsive to the data being loaded to target database 100, reporting function 110 queries the database Views to create a report showing the data loaded to target database 100 not conforming to the referential constraints on which the DDL Create View Statements were based (step 240). In one embodiment, reporting function 110 queries the database Views in target database 110 using an SQL query. Using the results of the query, reporting function 110 creates a report showing the data in each database View. The report may be stored on target system 50 or on any other system as long as the report is accessible to a user (e.g., database administrator). The report may be in the form of a file containing a table showing the data in each database View or any other form of information that can show the data loaded to target database 100 not conforming to the referential constraints on which the DDL Create View Statements were based.

FIG. 3 is an exemplary original file of DDL statements received by reporting function 110, in step 200, in accordance with one embodiment of the present invention. Original file of DDL statements 300 is created by the user (e.g., Database Administrator) at client system 30 using a data definition subsystem of DBMS 90 or a separate data modeler program accessed through UI 60. Original file of DDL statements 300 contains database structure statements 310 and NO_RI constraint 320. Database structure statements 310 are DDL statements that create, manage, and alter the structure of the target database. NO_RI constraint 320 is a referential constraint that a user determined will be used to generate a DDL Create View statement.

Database structure statements 310 are representative of statements contained in the file of DDL statements generated by reporting function 110 in step 230. Database structure statements 310 may create database tables 400 of FIG. 4 when executed to build target database 100. Create DDL statements are used to create objects such as tables in a database. Alter DDL statements may modify an existing structure (e.g., adding a column) or add a constraint. Database statement 330 is a DDL statement that creates employee table 430 and adds a constraint making Employee_ID a primary key. Database statement 340 is a DDL statement that creates department table 440 (see FIG. 4) and adds a constraint making Dept_ID a primary key.

NO_RI constraint 320 is representative of a DDL statement used to generate a DDL Create View statement. NO_RI constraint 320 is labeled as NO_RI so as to allow reporting function 110 to recognize that this referential constraint will be used to generate a DDL Create View statement. Reporting function 110 generates a file of a DDL Create View statement by converting NO_RI constraint 320 into DDL Create View statement 600 of FIG. 6.

FIGS. 5A-5C depict exemplary program code for executing steps 210 through 230 of reporting function 110 in accordance with one embodiment of the present invention. Code 500 is an example of one implementation of steps 210 through 230 of reporting function 110. Code 500 as depicted is written as an AIX Korn Shell Script. In other embodiments, other programming languages may be used. The other programming languages may be, for example, object-oriented and/or procedural programming languages.

FIG. 6 depicts an exemplary DDL Create View statement contained in a file of DDL Create View statements generated by reporting function 110 in accordance with one embodiment of the present invention. Reporting function 110 generates a file containing DDL Create View statement 600 by converting NO_RI constraint 320 in to a DDL Create View statement.

Figure 4:
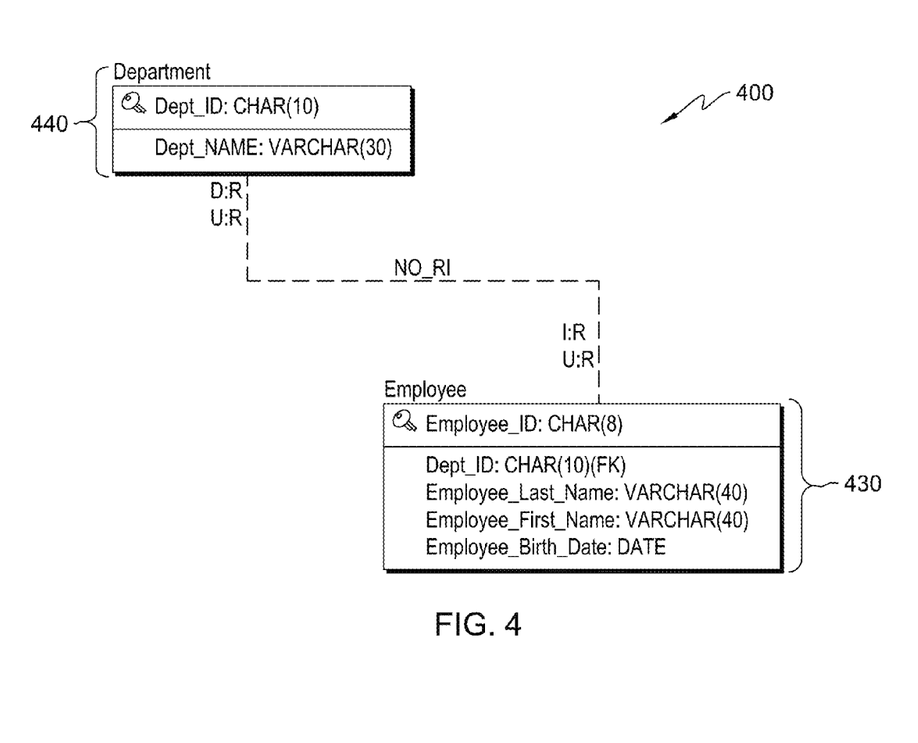
FIG. 4 is an exemplary set of database tables created by the exemplary DDL statements of FIG. 3 in accordance with one embodiment of the present invention.

If NO_RI constraint 320 was implemented in the build of target database 100 a constraint added to employee table 430 would designate Dept_ID as a foreign key value referencing department table 440 which has Dept_ID designated as a primary key. Dept_ID values in employee table 430 would be required to match a Dept_ID value in department table 440. DDL Create View statement 600 creates a database View showing data from employee table 430 that has a Dept_ID value that does not match a Dept_ID value in department table 440.

Figure 7A:
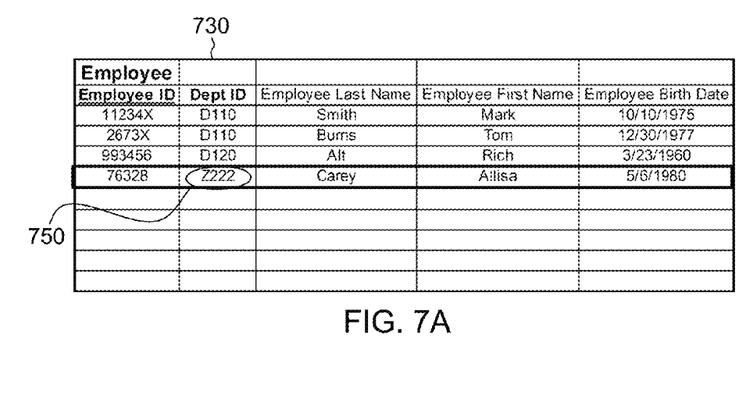
FIGS. 7A-7C depict exemplary tables of a target database that contain data loaded from a source database, and an exemplary database View containing data that does not adhere to a not enforced referential constraint of the target database.
Figure 7B:
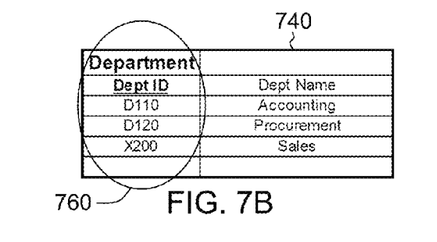
Figure 7C:
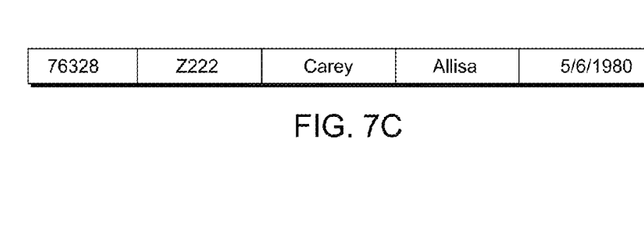

FIGS. 7A-7C depict exemplary tables of target database 100 that contain data loaded from source database 80, and an exemplary database View containing data that does not adhere to a not enforced referential constraint of target database 100.

FIGS. 7A and 7B depict employee table 730 and department table 740, respectively. DDL Create View statement 600 creates a database View showing data from employee table 730 that has a Dept_ID value that does not match a Dept_ID value in department table 740. Each employee entry in employee table 730 lists a Dept_ID. That Dept_ID in employee table 730 must match a Dept_ID listed in Dept_ID column 760 of department table 740. Dept_ID 750 (Z222) does not match a Dept_ID listed in Dept_ID column 760 of department table 740 (D110, D120, or X200).

The database View created by DDL Create View statement 600 will contain the information in the row of the employee whose Dept_ID value does not match a Dept_ID listed in Dept_ID column 760 of department table 740. In this example, the information of employee Allisa Carey will be contained in the database View as shown in FIG. 7C. FIG. 7C depicts information that will be contained in the database View created by DDL Create View statement 600.

Figure 8:
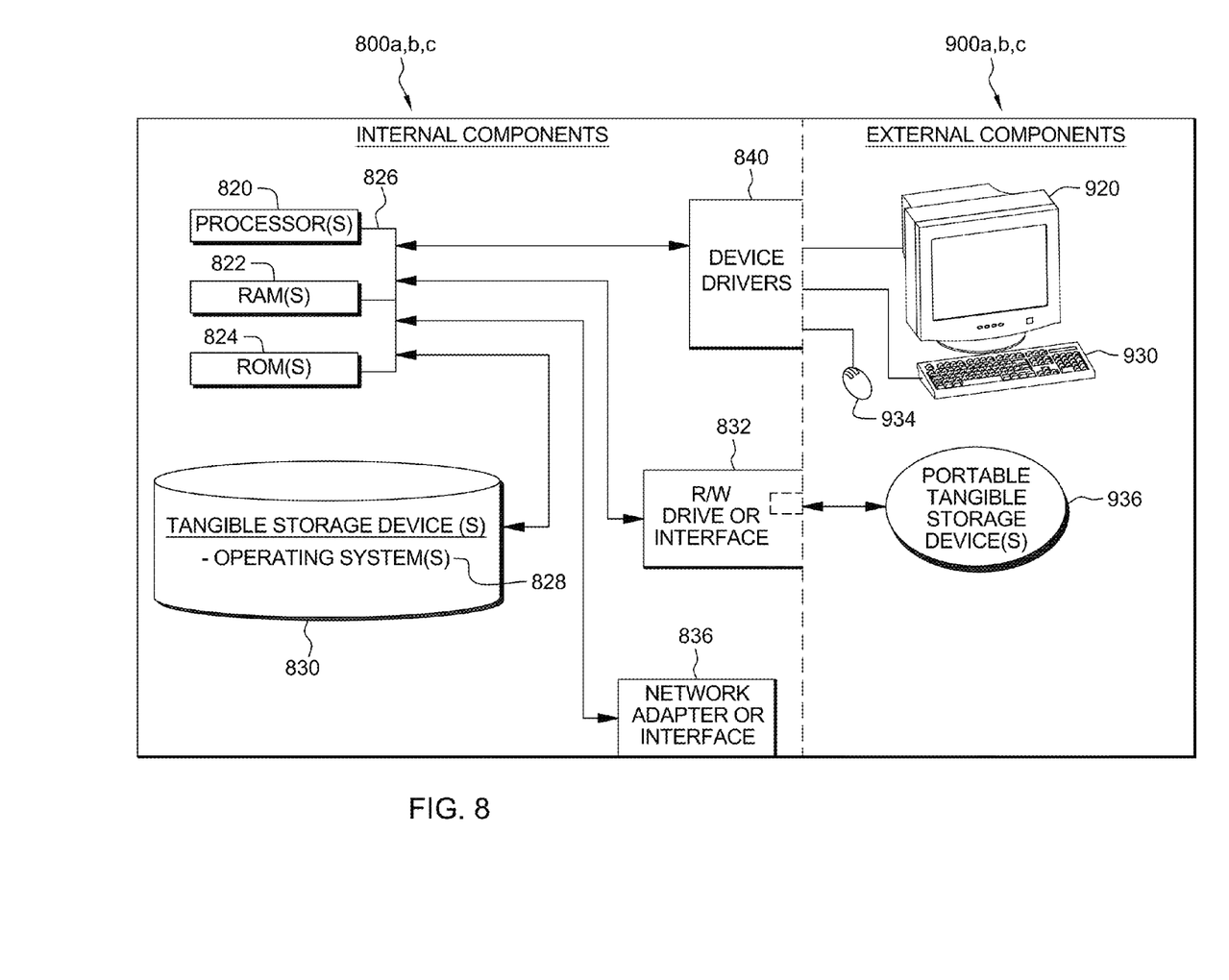
FIG. 8 is a block diagram of internal and external components of the computer systems of FIG. 1 in accordance with one embodiment of the present invention.

FIG. 8 is a block diagram of internal and external components of client system 30, source system 40, and target system 50 in accordance with one embodiment of the present invention.

Client system 30, source system 40, and target system 50 include respective sets of internal components 800a,b,c and external components 900a,b,c. Each of the sets of internal components 800a,b,c includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and UI 60 are stored on at least one of one or more of computer-readable tangible storage devices 830 of internal components 800a for execution by at least one of one or more of processors 820 of internal components 800a via at least one of one or more of RAMs 822 of internal components 800a (which typically include cache memory). The one or more operating systems 828, DBMS 70, and source database 80 are stored on at least one of one or more of computer-readable tangible storage devices 830 of internal components 800b for execution by at least one of one or more of processors 820 of internal components 800b via at least one of one or more of RAMs 822 of internal components 800b (which typically include cache memory). The one or more operating systems 828, DBMS 90, target database 100, and reporting function 110 are stored on at least one of one or more of computer-readable tangible storage devices 830 of internal components 800c for execution by at least one of one or more of processors 820 of internal components 800c via at least one of one or more of RAMs 822 of internal components 800c (which typically include cache memory). In the embodiment illustrated in FIG. 8, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a,b,c also includes a R/W drive or interface 832 to read from and write to one or more portable computer-readable tangible storage devices 936 such as a CD-ROM, DVD, memory stick, magnetic tape, magnetic disk, optical disk or semiconductor storage device. UI 60 can be stored on at least one of one or more of portable computer-readable tangible storage devices 936 of external components 900a, read via R/W drive or interface 832 of internal components 800a and loaded into at least one of computer-readable tangible storage devices 830 of internal components 800a. DBMS 70 and source database 80 can be stored on at least one of one or more of portable computer-readable tangible storage devices 936 of external components 900b, read via R/W drive or interface 832 of internal components 800b and loaded into at least one of computer-readable tangible storage devices 830 of internal components 800b. DBMS 90, target database 100, and reporting function 110 can be stored on at least one of one or more of portable computer-readable tangible storage devices 936 of external components 900c, read via R/W drive or interface 832 of internal components 800c and loaded into at least one of computer-readable tangible storage devices 830 of internal components 800c.

Each set of internal components 800a,b,c also includes a network adapter or interface 836 such as a TCP/IP adapter card. UI 60 can be downloaded to client system 30 from an external computer via a network (such as network 20) and network adapter or interface 836 of internal components 800a. From the network adapter or interface 836 of internal components 800a, UI 60 is loaded into at least one of computer-readable tangible storage devices 830 of internal components 800a. DBMS 70 and source database 80 can be downloaded to source system 40 from an external computer via a network (such as network 20) and network adapter or interface 836 of internal components 800b. From the network adapter or interface 836 of internal components 800b, DBMS 70 and source database 80 are loaded into at least one of computer-readable tangible storage devices 830 of internal components 800b. DBMS 90, target database 100, and reporting function 110 can be downloaded to target system 50 from an external computer via a network (such as network 20) and network adapter or interface 836 of internal components 800c. From the network adapter or interface 836 of internal components 800c, DBMS 90, target database 100, and reporting function 110 are loaded into computer-readable tangible storage devices 830 of internal components 800c. The network may comprise copper wires, optical fibers, wireless transmission, routers, firewalls, switches, gateway computers and/or edge servers.

Each of the sets of external components 900a,b,c can include a computer display monitor 920, a keyboard 930, and a computer mouse 934. External components 900a,b,c can also include touch screens, virtual keyboards, touch pads, pointing devices, and other human interface devices. Each of the sets of internal components 800a,b,c also includes device drivers 840 to interface to computer display monitor 920, keyboard 930 and computer mouse 934. Device drivers 840, R/W drive or interface 832 and network adapter or interface 836 comprise hardware and software (stored in storage device 830 and/or ROM 824).

UI 60, DBMS 70, DBMS 90, and reporting function 110 can be written in various programming languages (such as Java, C++) including low-level, high-level, object-oriented or non object-oriented languages. Alternatively, the functions of UI 60, DBMS 70, DBMS 90, and reporting function 110 can be implemented in whole or in part by computer circuits and other hardware (not shown).

Based on the foregoing, a computer system, a method and a program product have been disclosed for reporting data loaded to a database that does not adhere to the referential constraints of the database that are not enforced. The description above has been presented for illustration purposes only. It is not intended to be an exhaustive description of the possible embodiments. One of ordinary skill in the art will understand that other combinations and embodiments are possible. Therefore, the present invention has been disclosed by way of example and not limitation.

What is claimed is:

1. A method for reporting data loaded to a database that does not adhere to one or more referential constraints of the database that are not enforced, the method comprising the steps of:
    a computer receiving an original file of a plurality of Data Definition Language (DDL) statements for creating a database;
    the computer identifying one or more DDL statements from the plurality of DDL statements that comprise text indicating the one or more DDL statements are referential constraints not to be enforced in the database, and in response, the computer converting the one or more DDL statements to one or more DDL create view statements, respectively;
    the computer generating a first file comprising the one or more DDL create view statements, wherein the one or more DDL create view statements are used to generate one or more database views, respectively, during a build of the database;
    the computer generating a second file, comprising the plurality of DDL statements without the one or more DDL statements from the plurality of DDL statements that comprise the text indicating the one or more DDL statements are referential constraints not to be enforced in the database, used to build the database; and
    responsive to new data being loaded to the database, the computer creating a report comprising data from the one or more database views.

2. The method of claim 1, further comprising the steps of:
    the computer executing the first file and the second file to build the database; and
    the computer loading the new data to the database from a source database.

3. The method of claim 1, wherein the step of the computer creating a report comprises the steps of:
    the computer querying the one or more database views;
    the computer receiving data from the one or more database views; and
    the computer creating a report file comprising the data from the one or more database views.

4. The method of claim 1, wherein the text indicating the one or more DDL statements are referential constraints not to be enforced in the database comprises a character sequence of NO_RI.

5. The method of claim 1, wherein the text indicating the one or more DDL statements are referential constraints not to be enforced in the database comprises a character sequence of foreign key.

6. A computer program product for reporting data loaded to a database that does not adhere to one or more referential constraints of the database that are not enforced, the computer program product comprising:
    one or more computer-readable tangible storage devices and program instructions stored on at least one of the one or more storage devices, the program instructions comprising:
    program instructions to receive an original file of a plurality of Data Definition Language (DDL) statements for creating a database;
    program instructions to identify one or more DDL statements from the plurality of DDL statements that comprise text indicating the one or more DDL statements are referential constraints not to be enforced in the database, and in response, the computer converting the one or more DDL statements to one or more DDL create view statements, respectively;
    program instructions to generate a first file comprising the one or more DDL create view statements, wherein the one or more DDL create view statements are used to generate one or more database views, respectively, during a build of the database;
    program instructions to generate a second file, comprising the plurality of DDL statements without the one or more DDL statements from the plurality of DDL statements that comprise the text indicating the one or more DDL statements are referential constraints not to be enforced in the database, used to build the database; and
    responsive to new data being loaded to the database, program instructions to create a report comprising data from the one or more database views.

7. The computer program product of claim 6, further comprising:

program instructions, stored on at least one of the one or more storage devices, to execute the first file and the second file to build the database; and program instructions, stored on at least one of the one or more storage devices, to load the new data to the database from a source database.

8. The computer program product of claim 6, wherein the program instructions to create a report comprises:

program instructions to query the one or more database views;

program instructions to receive data from the one or more database views; and program instructions to create a report file comprising the data from the one or more database views.

9. The computer program product of claim 6, wherein the text indicating the one or more DDL statements are referential constraints not to be enforced in the database comprises a character sequence of NO_RI.

10. The computer program product of claim 6, wherein the text indicating the one or more DDL statements are referential constraints not to be enforced in the database comprises a character sequence of foreign key.

11. A computer system for reporting data loaded to a database that does not adhere to one or more referential constraints of the database that are not enforced, the computer system comprising:

one or more processors, one or more computer-readable memories, one or more computer-readable tangible storage devices and program instructions which are stored on at least one of the one or more storage devices for execution by at least one of the one or more processors via at least one of the one or more memories, the program instructions comprising:

program instructions to receive an original file of a plurality of Data Definition Language (DDL) statements for creating a database;

program instructions to identify one or more DDL statements from the plurality of DDL statements that comprise text indicating the one or more DDL statements are referential constraints not to be enforced in the database, and in response, the computer converting the one or more DDL statements to one or more DDL create view statements, respectively;

program instructions to generate a first file comprising the one or more DDL create view statements, wherein the one or more DDL create view statements are used to generate one or more database views, respectively, during a build of the database;

program instructions to generate a second file, comprising the plurality of DDL statements without the one or more DDL statements from the plurality of DDL statements that comprise the text indicating the one or more DDL statements are referential constraints not to be enforced in the database, used to build the database; and responsive to new data being loaded to the database, program instructions to create a report comprising data from the one or more database views.

12. The computer system of claim 11, further comprising:

program instructions, stored on at least one of the one or more storage devices for execution by at least one of the one or more processors via at least one of the one or more memories, to execute the first file and the second file to build the database; and program instructions, stored on at least one of the one or more storage devices for execution by at least one of the one or more processors via at least one of the one or more memories, to load the new data to the database from a source database.

13. The computer system of claim 11, wherein the program instructions to create a report comprises:

program instructions to query the one or more database views;

program instructions to receive data from the one or more database views; and program instructions to create a report file comprising the data from the one or more database views.

14. The computer system of claim 11, wherein the text indicating the one or more DDL statements are referential constraints not to be enforced in the database comprises a character sequence of NO_RI.

15. The computer system of claim 11, wherein the text indicating the one or more DDL statements are referential constraints not to be enforced in the database comprises a character sequence of foreign key.

\* \* \* \* \*